(12) United States Patent
Li

(10) Patent No.: US 7,978,941 B2
(45) Date of Patent: Jul. 12, 2011

(54) SINGLE MODE PHOTONIC CIRCUIT ARCHITECTURE AND A NEW OPTICAL SPLITTER DESIGN BASED ON PARALLEL WAVEGUIDE MODE CONVERSION

(76) Inventor: Bing Li, Bothell, WA (US)

( * ) Notice: Subject to any disclaimer, the term of this patent is extended or adjusted under 35 U.S.C. 154(b) by 0 days.

(21) Appl. No.: 12/686,227

(22) Filed: Jan. 12, 2010

(65) Prior Publication Data
US 2010/0172619 A1    Jul. 8, 2010

Related U.S. Application Data

(62) Division of application No. 11/757,394, filed on Jun. 4, 2007, now Pat. No. 7,668,416.

(60) Provisional application No. 60/810,865, filed on Jun. 5, 2006.

(51) Int. Cl.
*G02B 6/12* (2006.01)

(52) U.S. Cl. ........... 385/14; 385/129; 385/130; 385/132

(58) Field of Classification Search ............... 385/14, 385/129, 130, 132
See application file for complete search history.

(56) References Cited

U.S. PATENT DOCUMENTS

| | | | |
|---|---|---|---|
| 6,749,893 B2* | 6/2004 | Ouellet et al. | 427/162 |
| 7,065,272 B2 | 6/2006 | Taillaert et al. | |
| 7,289,698 B2 | 10/2007 | Deliwala | |
| 7,352,926 B2* | 4/2008 | Spoonhower et al. | 385/15 |
| 2008/0002928 A1 | 1/2008 | Li | |

* cited by examiner

*Primary Examiner* — Jennifer Doan
(74) *Attorney, Agent, or Firm* — Vidas, Arrett & Steinkraus, P.A.

(57) ABSTRACT

The new single mode circuit (SMC) architecture is invented for photonic integrated circuits (PIC). This architecture allows using multimode waveguides or structures to construct a single mode operated PIC. The multimode sections used in such SMC based PIC possess strong lateral confinement so that the PIC can have high circuit density and high optical performance at the same time. A parallel mode converter structure is also invented here. Based on this parallel mode converter, a low loss optical splitter can be constructed for high index contrast waveguide system.

20 Claims, 7 Drawing Sheets

········ The wavefront of the 2-D gaussian beam in the slab waveguide free space region
⁓⁓⁓⁓ The outline of the deep etch (the deep etch is applied on the area outside this outline)
——— The outline of the shallow etch (the shallow etch is applied on the area outside this outline)

SINGLE MODE PHOTONIC CIRCUIT ARCHITECTURE AND A NEW OPTICAL SPLITTER DESIGN BASED ON PARALLEL WAVEGUIDE MODE CONVERSION

CROSS-REFERENCE TO RELATED APPLICATIONS

This application claims the benefit and is a Divisional of U.S. application Ser. No. 11/757,394, filed Jun. 4, 2007, now U.S. Pat. No. 7,668,416 which claims the benefit of U.S. Provisional Application No. 60/810,865, filed Jun. 5, 2006, the entire contents of which are hereby incorporated herein by reference.

BACKGROUND OF THE INVENTION

In the past, photonic integrated circuits (PIC), which is also called planar lightwave circuits (PLC) or optical integrated circuits (OIC), are designed using single mode optical waveguide structures. The reasons of using single mode waveguide is to ensure that the whole circuits is within the single mode operation region, therefore, no high order modes will be excited both within the circuits and at the interface of the coupling to the outside world, usually to optical single mode fiber. If the waveguide is not single mode, when the higher order modes are excited, multiple guiding modes will propagate together along the waveguides and each mode carries part of signal power. As the result of the multimode propagation, the signal will suffer significant mode dispersion and random coupling among the modes when discontinuity or structure change occurs. The coupling from the PIC to the end single mode fiber will have large and random loss, making the device not usable in the system.

Figure 1:
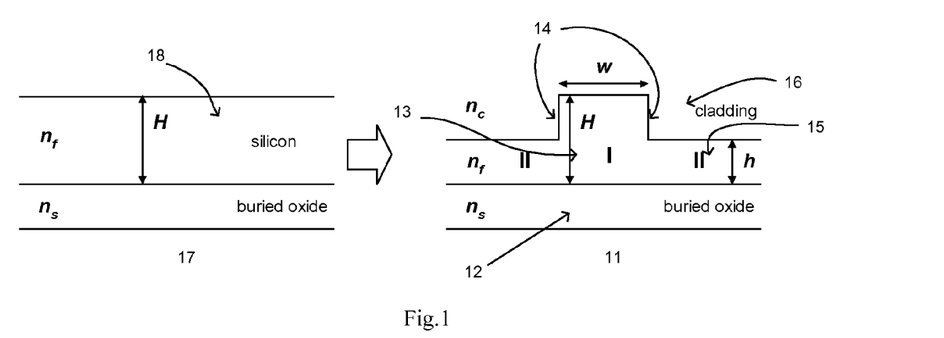
FIG. 1 shows embodiments of traditional silicon-on-insulator optical waveguides.

However, the single mode operation condition of the waveguide is, some time, too restrictive. It will also create problems for the coupling and the achievable circuit density of PICs. A typical example is the silicon-on-insulator (SOI) optical waveguide as shown in FIG. 1.

<11>: Ridge waveguide cross section;
<12>: The substrate of the ridge waveguide (bottom cladding);
<13>: Ridge waveguide core;
<14>: The ridge;
<15>: Slab region of the ridge waveguide;
<16>: Top cladding of the ridge waveguide;
<17>: The layer structure of the starting SOI wafer;
<18>: The silicon layer of the starting SOI wafer;

Due to the strong material index contrast between the core <13> and the cladding (substrate) in SOI ($n_f$=3.48 vs. $n_{c(f)}$=1.44~1.8), for large dimension comparable with the regular single mode fiber, the single mode condition must be maintained by the weaker lateral effective index contrast, which is between the slab mode effective indices of the region I and II <15>. The slab region itself, both I and II, are multimode, but the lateral effective index contrast is so weak that all the high order vertical mode of slab region I can not propagate without radiation into the region II.

Since the vertical index contrast in SOI structure is much stronger than other material systems, such as silica ($SiO_2$) and polymer, the SOI waveguide usually ends up have weaker lateral index contrast than silica and polymer based waveguide. It makes the SOI waveguide PIC with large cross section has to have larger bending radius, which results in low circuit density. To achieve a similar bending radius as silica waveguide, the waveguide dimension must be reduced to about half of the single mode fibers, which causes severe problem in coupling. A 3D on-chip taper usually must be used to reduce the coupling loss.

Another problem with SOI based PIC is the splitter junction loss. A typical excess loss of a SOI based waveguide splitter due to the splitter junction is usually ~1 dB, while the silica based waveguide splitter has only less than 0.5 dB. The larger junction loss is because the high-index contrast between the silicon dioxide (cladding) and the silicon (waveguide core), and the ridge structure itself. When the mode hits the junction, a significant scattering will occur and the field gets an abrupt disturbance. An example is demonstrated in FIG. 2, a 1×2 splitter junction <21>.

BRIEF SUMMARY OF THE INVENTION

There are two structures are invented here to solve the problem faced by the SOI PIC, and any other high index material system: the conflict between the density of the circuit and its performance. The first invented structure, or architecture, or design method, is the single mode photonic circuit (SMC) in which multimode waveguide can be used. Without the constraint of single mode waveguide condition, the multimode waveguides used in the SMC have both high lateral index contrast and therefore the PIC can have small bend radius, resulting in high density of the photonic circuit, and the high optical performance at the same time. Also, the thick silicon layer <18> can be used, to make the PIC easy to be coupled with standard single mode fiber.

The second invented structure is a parallel mode converter that can be used to construct a low loss optical splitter in any splitting ratio. With the parallel mode converter, the lightwave splitting is realized during the mode conversion between the input single channel waveguide mode and the super modes of the output multiple parallel-coupled channel waveguide. By eliminating the scattering caused by the oxide between the channels, the optical splitter can have the excess loss as low as those based on regular low index contrast material system.

DETAIL DESCRIPTION OF THE INVENTION

Single Mode Photonic Circuits (SMC) Architecture

The first invented structure, or architecture, or a design approach, is the single mode photonic circuits (SMC) in which the multimode waveguide can be used. As we mentioned before, the whole PIC must be maintained as single mode operation, but it doesn't have to be achieved by the single mode waveguide. The idea is a new concept: single mode at system (circuit) level. As long as the whole circuit can only operate at one mode, the individual section can be constructed by multimode waveguides. A mode filter will be inserted after the multimode section. If designed correctly, the high order modes will not be excited in those multimode sections, and even they are, the mode filter will remove those high order components and keep the whole system at the single mode. In the ideal case, the high order mode excitation will never occur after the mode filter of the fiber-to-PIC coupling interface since only the main guiding mode is excited and shall be maintained as long as the continuity of the waveguide is ensured. In practice, the coupling to the high order mode from the excited main guiding mode may occur due to the imperfectness of the waveguide, such as the rough side wall. The excited high order modes will be removed by the mode filter following the multimode waveguide section; and the power loss due to this removal is equivalent to the power loss due to the scattering loss in regular single mode waveguide based PICs, since such scattering loss is nothing but the mode coupling from the guiding mode to the radiation mode in regular single mode waveguide.

Figure 3:
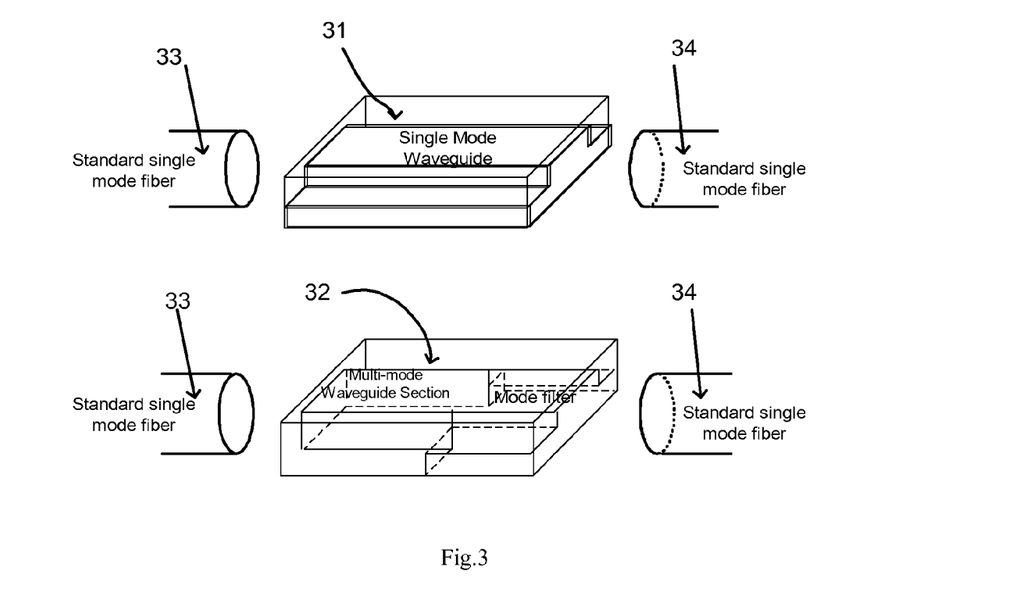
FIG. 3 shows an embodiment of a single mode photonic circuit using a single mode waveguide and an embodiment of a single mode photonic circuit using a multi-mode waveguide.

The principle of the SMC is shown in FIG. 3, which explains the reason why the PIC based on the SMC architecture is equivalent to the PIC based on purely single mode waveguide. In FIG. 3:

<31>: PIC based on single mode waveguide from end to end;

<32>: PIC based SMC architecture in which multimode waveguides are used;

<33>: The single mode fiber at the input side of the PIC;

<34>: The single mode fiber at the output side of the PIN;

Expression (2a) and (2b) are the insertion loss caused by the coupling, in the case of <31> and <32> respectively. In (2a), $\Phi_F$ is the fiber mode, $\Psi_{SMW}$ is the fundamental guiding mode of the single mode waveguide, $\Psi^k_R$ is the radiation modes of the single mode waveguide, and $\eta^k_R$ is the transmission coefficient of each radiation mode. In principle, when the single mode waveguide length long enough, $\eta^k_R \equiv 0$ for all k. One should notice that in (2a), the radiation modes are discrete, which is an approximate expression of the continuous radiation mode spectrum of the single mode waveguide. In (2b), $\Psi_{MMW\_0}$ is the fundamental guiding mode of the multimode waveguide, $\Psi_{MMW}$ and $\eta^k_{MMW}$ are the high order mode of the multimode waveguide and its transmission coefficient. We find that once the radiation mode of the single mode waveguide is included, the expression (2a) and (2b) are very similar. Mathematically, the only difference between single mode waveguide and multimode waveguide PIC is that the $\eta^k_R$ equals zero naturally, while $\eta^k_{MMW}$ is not equal to zero usually, unless that we force it. By forcing $\eta^k_{MMW}=0$, a multimode waveguide PIC <32> can function as a single mode system.

$$\alpha_{SMW} = \langle \Phi_F \cdot \Psi_{SMW} \rangle^2 + \left( \Phi_F \cdot \sum_k \langle \Phi_F \cdot \Psi^k_R \rangle \Psi^k_R \cdot \eta^k_R \right) \quad (2a)$$

$$\alpha_{SMC} = \langle \Phi_F \cdot \Psi_{MMW\_0} \rangle^2 + \left( \Phi_F \cdot \sum_k \langle \Phi_F \cdot \Psi^k_{MMW} \rangle \Psi^k_{MMW} \cdot \eta^k_{MMW} \right) \quad (2b)$$

Figure 4:
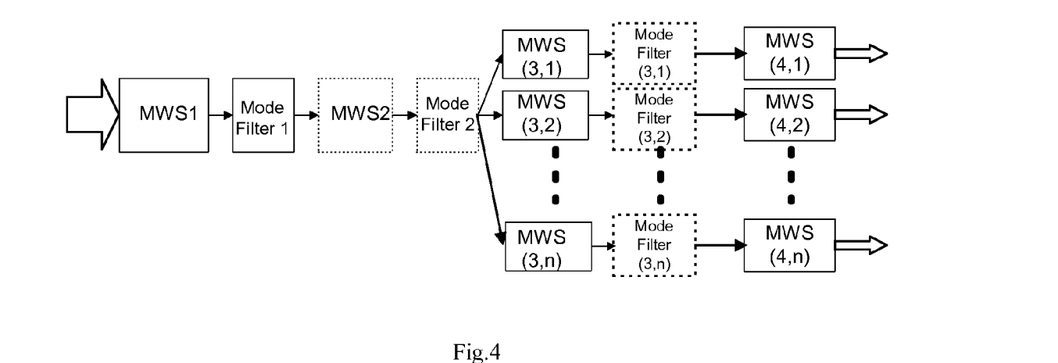
FIG. 4 shows a block diagram for an embodiment of single mode photonic integrated circuits using multimode waveguides.

The way of forcing $\eta^k_{MMW}=0$ is to add a mode filter after the multimode sections (MWS). In general, a PIC using SMC structure can be described as a block diagram as in FIG. 4. In the FIG. 4, the left is the input side, and the right is output side. The first multimode section (MWS1) is usually designed to increasing the coupling efficiency (better mode match with the input fiber or other source devices). The mode filter 1 follows the MWS1 to depress all the possible high order mode excitements at the coupling interface. Please note this high order mode depression will not cause any extra loss for the PIC, because all the high order mode excitation result from the mode mismatch between input fiber mode and the fundamental mode of the MWS1. This part of loss is the same as in the case of the single mode waveguide PIC, in which the mode mismatch part will excite the radiation modes. After mode filter 1, the MWS2 is possible for the bending purpose or mode conversion purpose. In principle, SMC architecture can have mode filter after every MWS, but in practical, it is not necessary to dd that, after the mode filter 1, if the following MWS sections are ideal and not high order mode will be excited due to the imperfectness of the waveguide, the mode filter 2 or other mode filters can be skipped. In the real design, the excitement of the high order mode is inevitable; the mode filter must be added in the sensitive part of the SMC based PIC to avoid the failure of the device functions. However, all these mode filters will not affect the device performance since it simply depress the high order mode excitement corresponding to the radiation mode excitement in the single mode waveguide PIC.

To make the description clear, we give several SMC examples.

Figure 5:
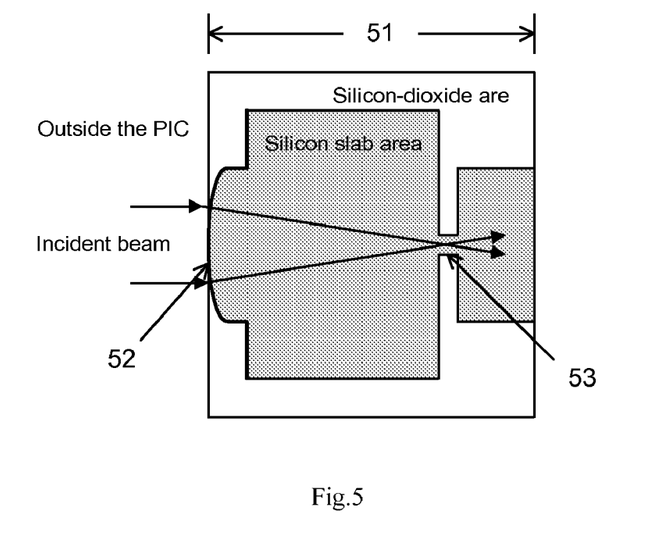
FIG. 5 shows an embodiment of a waveguide lens pinhole structure.

FIG. 5 is a waveguide lens-pinhole structure that is very similar with that people has used in traditional free space optics. In FIG. 5:

<51>: Waveguide lens-pinhole PIC, in which the waveguide pinhole is the mode filter. This PIC usually is a portion of the bigger PIC in which it works as a input section to couple with outside fiber;

<52>: The waveguide lens formed by etching on the edge of the PIC;

<53>: Waveguide pinhole;

The input beam, from single mode fiber for instance, is focused by the edge waveguide lens <52>, and then propagates through a slab waveguide region, which can be regarded as an infinite multimode channel waveguide. A pin-hole filter <53> after the slab waveguide region will remove any multimode components excited by displacement of input beam on incident angle and the position. Although in this example, the mode filter only works for the high order mode on lateral axis, not for the high order mode on vertical axis.

Figure 6:
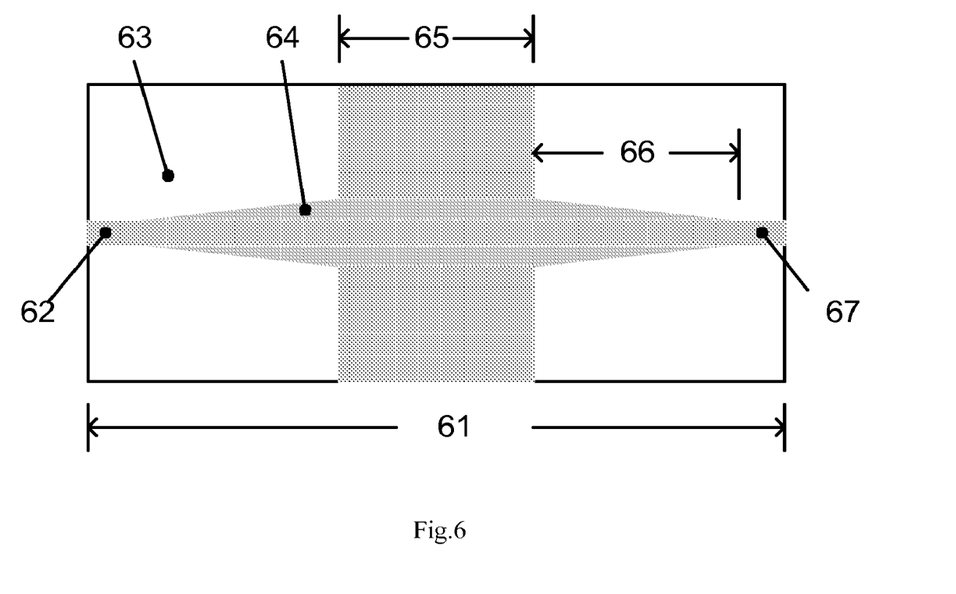
FIG. 6 shows an embodiment of a mode filter.

FIG. 6 is a mode filter design example using weak-guided single mode waveguide structure, in the figure:

<61>: Weak Guiding Single Mode Waveguide mode filter;

<62>: Ridge of the strong confined multimode ridge waveguide at input side;

<63>: Deep etched are with silicon-dioxide (or other low index dielectric) filled;

<64>: Shallow etched area with silicon-dioxide (or other low index dielectric) filled;

<65>: Weak guiding single mode waveguide section;

<66>: Taper section for mode conversion between weak guiding section and the multimode section;

<67>: Ridge of the strong confined multimode ridge waveguide at output side;

Necessary taper structure <66> is used for the transition between multimode waveguide section (MWS) to the weak guiding single mode waveguide section. In the particular application like SOI waveguide based PIC, the multimode waveguide with large cross section and deeper etch has better mode matching with the regular single mode fiber. So this structure can be used to reduce the coupling loss while the SMC structure maintains the single mode operation of the whole circuits.

Figure 7:
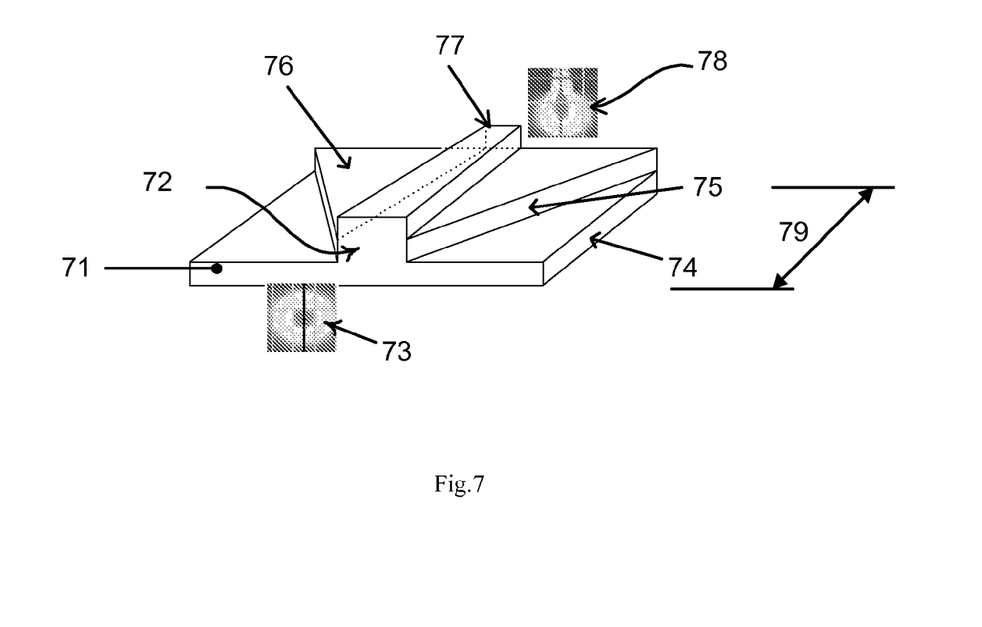
FIG. 7 shows an embodiment of an optical waveguide mode converter.

FIG. 7 is the example of an abnormal 3D mode size converter design, which has actually been used in the mode filter example in FIG. 6. In FIG. 7:

<71>: After etching, the remaining silicon surrounded by silicon-dioxide or other low index dielectric;

<72>: The input facet of the PIC;

<73>: The fundamental mode profile of the waveguide at the input facet;

<74>: The low-level silicon slab, formed by deep etching;

<75>: The high-level silicon slab, formed by shallow etching;

<76>: The shoulder of the shallow etched ridge waveguide;

<77>: The output facet;

<78>: The fundamental mode profile of the waveguide at the output facet;

<79>: The abnormal mode converter;

The interface end to the fiber is a deep etch ridge waveguide that has almost circular mode profile, a perfect match with the guiding mode of regular optical fiber. The deep etch ridge waveguide is multimode waveguide in nature, then into the chip, the waveguide transfer into a shallow etched waveguide with a shoulder structure on both side. Different from the mode size converter design in prior art, in our abnormal mode converter, the shallow ridge etch tapered in (narrower and narrower) or not tapering at all, and the shoulder tapered out (wider and wider). The deep etch can potentially go all the way to the bottom of the original silicon slab of the SOI wafer (stop at the buried oxide layer), in such case, the low-level slab <74> has 0 thickness.

Figure 8:
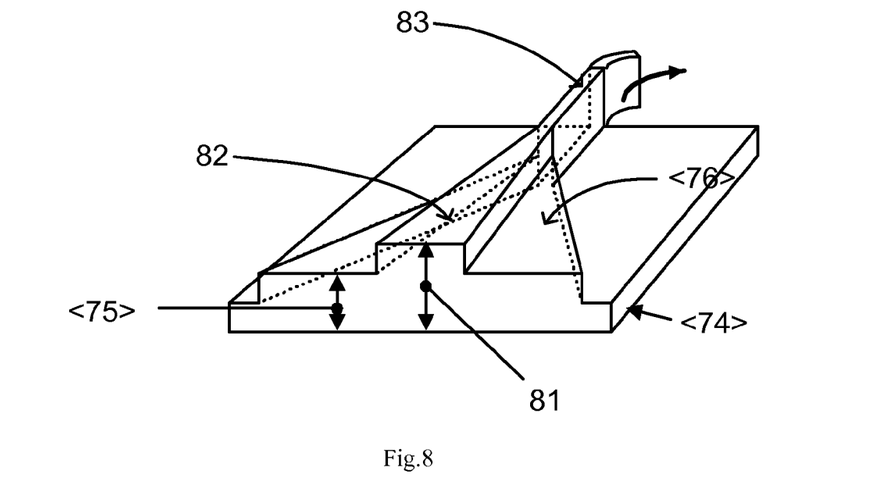
FIG. 8 shows another embodiment of an optical waveguide mode converter.

FIG. 8 is a structure where a deep etched waveguide with strong lateral confinement, which although it is a multimode waveguide, can be used to reduce the bending radius, therefore improve the overall circuit density. In FIG. 8:

<81>: the starting silicon slab of the SOI wafer;

<82>: the ridge (waveguide) formed by shallow etch;

<83>: the ridge (waveguide) formed by deep etch;

The structure in FIG. 8 can follow the structure in FIG. 6 in the real design of the SMC based PIC.

Parallel Mode Converter for Low Loss Optical Splitter PIC

Figure 2:
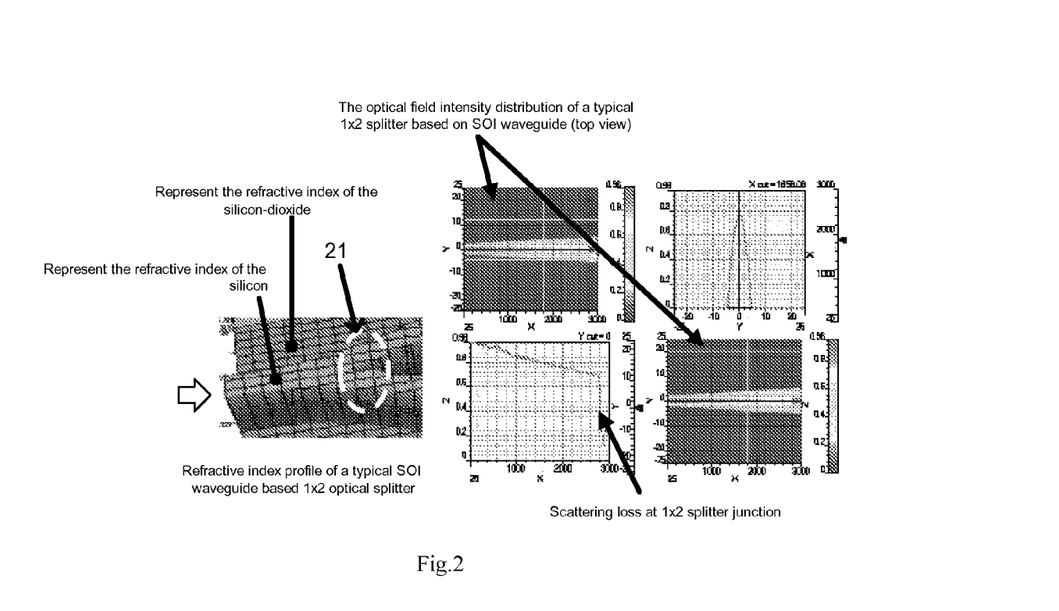
FIG. 2 shows an embodiment of a traditional optical splitter.
Figure 9:
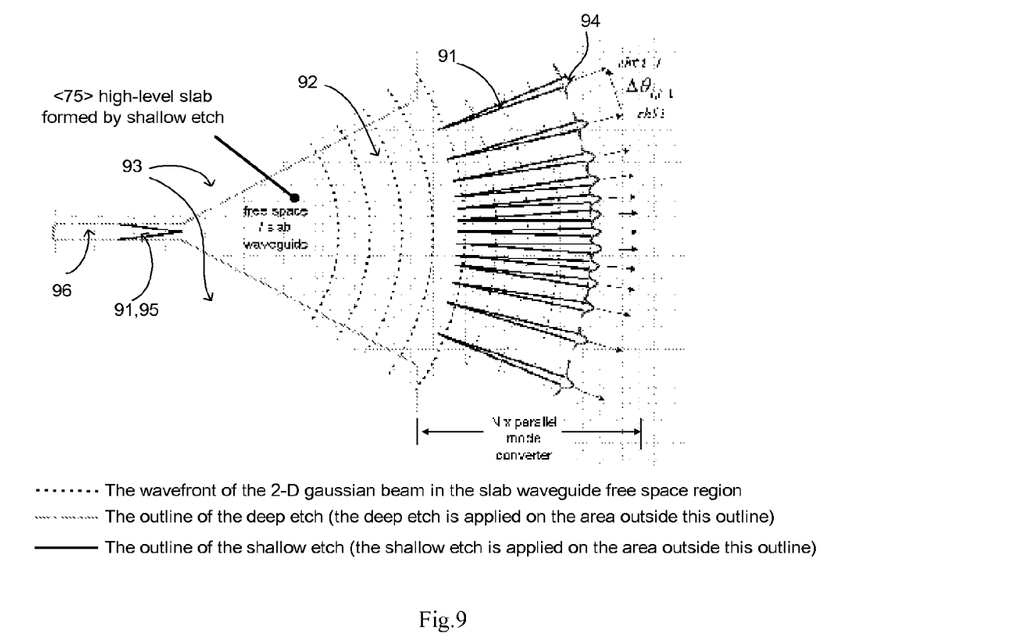
FIG. 9 shows an embodiment of a parallel mode converter.

Another structure invented here is a parallel mode conversion structure used for waveguide optical splitter, or other similar devices. As we mentioned before, the SOI waveguide splitter suffers significant junction loss due to the scattering caused by the low index material between two adjacent waveguides (FIG. 2). The invented parallel mode conversion device is shown in FIG. 9. This structure can help to almost eliminate the scattering loss and split the incident power with any desired distribution. In FIG. 9:

<91>: the area circled by the shallow etch outline, in which the shallow etch will not be applied;

<92>: the slab waveguide free space region, formed by applying shallow etch in the area circled by deep etch outline (where deep etch was not applied);

<93>: the area where the deep etch was applied. This area will be covered by the silicon-dioxide or other low index dielectrics in the following process step;

<94>: after the splitting, the optical mode profile of one of the optical channels;

<95>: the single channel mode converter (mode converter 1), which pushes the light down to the high-level silicon slab and let the light completely confined by the high level slab <75>;

<96>: the waveguide for input coupling, which is multimode and designed for coupling efficiency.

Figure 10:
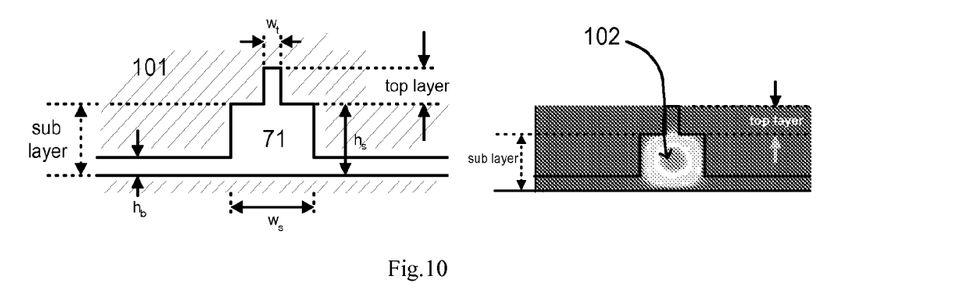
FIG. 10 shows a waveguide cross-section at one end of an embodiment of an optical waveguide mode converter and the guiding mode profile for the waveguide at that end.

The waveguide splitter shown in FIG. 9 has two etch steps (mask layers). The first step (deep etch) creates the ridge waveguide to reduce the coupling loss (as explained earlier in paragraph [013]). The second etch layer is a shallow etch comparing to the first step, and it creates the single mode waveguide needed by the mode filter. The mode converter 1 is a taper structure in which the width of ridge created by the second step (shallow etch) gradually gets narrower until the minimum feature size allowed, while the width of the first-etch-created ridge is kept the same. The mode converter will push the light down, and at the end of the converter, the mode will be something like <102> in FIG. 10. In FIG. 10:

<101>: the oxide or other low index dielectric deposited on top of silicon after all the etching steps;

<102>: the mode profile of the waveguide at the end of mode converter <95>;

In FIG. 10, we define two physical layers: (1) the sub layer, between the surface created by the second (shallow) etch and the bottom of silicon slab; (2) the top layer, between the top surface of the silicon slab and the surface created by the second (shallow) etching. The sub layer is the same as the high-level slab <75> defined in FIG. 7. In the splitter structure of FIG. 9, the light was pushed down by the mode converter <95> and mainly confined inside the sub layer. Then it propagates into the sub-layer free space region (a slab waveguide region form by sub layer without lateral confinement). Inside the sub-layer free space region, the light propagates as a circular wave (Gaussian beam) until it reaches the parallel mode converter.

Figure 11:
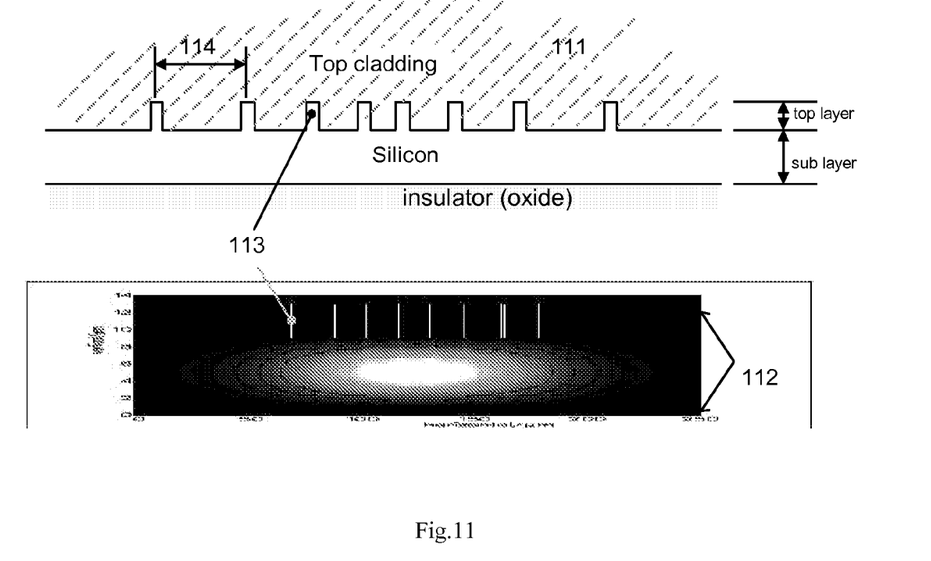
FIG. 11 shows a waveguide cross-section at one end of an embodiment of a parallel mode converter and its supermode's mode profile at that end.

An example of the cross-section of the parallel mode converter is shown in FIG. 11, in the figure:

<111>: top cladding of the waveguide, for example, the TEOS (oxide) in SOI-CMOS;

<112>: mode profile of the supermode of the parallel coupled waveguide at this location;

<113>: waveguide ridge of the channels, formed by the shallow etch;

It is at the starting point that is facing the sub-layer free space region <92>. Because the ridge created by the second etch is narrow, at the starting point facing the free space, the mode is mainly confined in the sub layer, which provides the best match with the field pattern coming from the sub-layer free space region. That is the fundamental reason why this parallel mode converter structure can almost eliminate the scattering loss that exists in the traditional splitter junctions.

Figure 12:
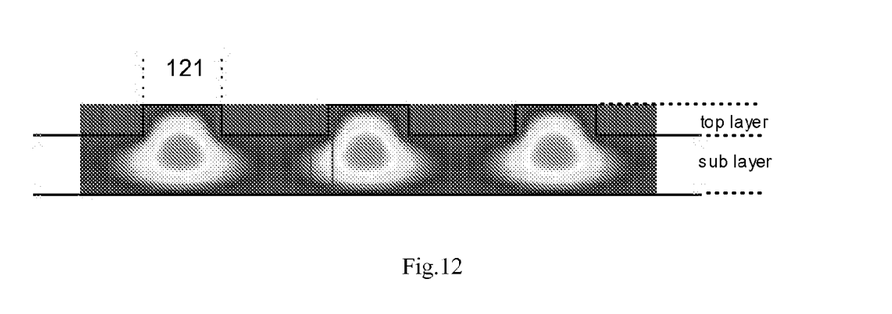
FIG. 12 shows a wave concentration diagram for an embodiment of a multi-ridge waveguide.

In the parallel mode converter, after the starting point, the ridge width of top layer will become wider and wider. The light will then gradually move back into the top layer and be more and more confined laterally. At the end of the mode converter away from the sub-layer free space region <92>, the light will be split and separated into each individual waveguide, as shown in FIG. 12, in the figure:

<121>: the waveguide ridge of one of the separated channels.

The parallel mode converter can also be regarded as a parallel reverse taper. In traditional waveguide splitters, a parallel normal taper is used to bring the light from the free space region to individual waveguides. Parallel reverse taper achieve the same function as the parallel normal taper, but with the smallest possible scattering loss. In traditional splitters, along the aperture (the interface between free space and the starting point of the parallel taper), the width of the waveguide increases from the center channel to the edge channel. The gap between waveguides is the minimum. At the starting point, the mode is wide and superposition of the modes of all the waveguides has the optimized matching with the overall field pattern along the aperture of the free space region. Then the taper converts the wide mode at the starting point to the strong confined guiding mode of the single mode waveguide. The reverse taper not only has wide mode at the starting point, but also has the mode most confined in the sub layer, therefore, no scattering loss, caused by the low index material in the gap region.

Figure 13:
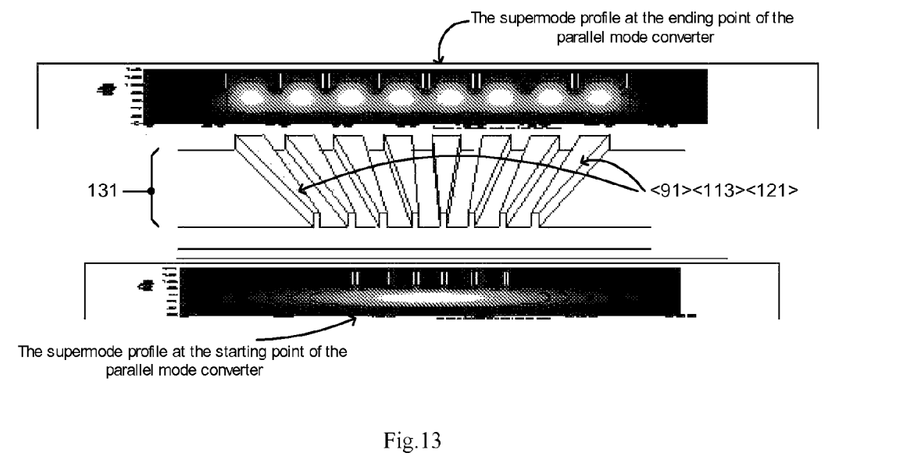
FIG. 13 shows an embodiment of a parallel mode converter and wave concentration diagrams on either end of the parallel mode converter.

FIG. 13 shows, from the starting point to the ending point, how the optical field along the parallel mode converter is converted from a Gaussian type of supermode that mainly confined in the sub-layer, to an individual confined parallel multi-channel supermode. <131> is a 3D illustration of parallel reverse mode converter for waveguide splitter.

Figure 14:
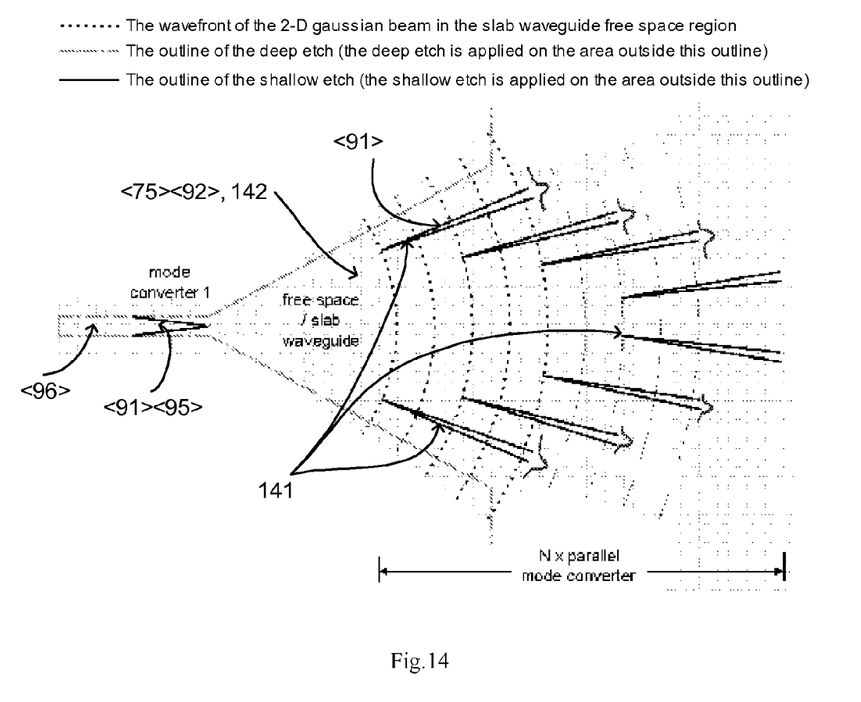
FIG. 14 shows another embodiment of a parallel mode converter.

FIG. 14 gives another possible variation of the parallel mode converter based splitter structure, in the figure:

<141>: the starting points of the each individual channels at the parallel mode converter;

<142>: the lateral free propagation region, the vertical confined provided by the sub-layer slab formed by the shallow etch;

The main difference between the structure in FIG. 14 and the structure in FIG. 9 is the starting points of the each channels at the parallel mode converter is not aligned with the wave front of the cylinder wave from the lateral free propagation region <142><92>: the channels closer to the center will start later, so that, the edge channels can absorb the light from the sub-layer earlier, to compensate the position of the channels of being on the edge, to eventually make sure the uniform power distributions among the channels at the end of the mode converter.

What is claimed is as follows:

1. Single mode photonic circuit architecture for planar lightwave circuits, said single mode photonic circuit architecture uses multiple pairs of multimode waveguide section and mode filter; said multimode waveguide is the ridge waveguide with the lateral index contrast greater than the single mode ridge waveguide at the same material system, so that small bend radius can be used; said ridge waveguide with larger lateral index contrast is realized by deep etch into the silicon in a silicon-on-insulator system.

2. The single mode photonic circuit architecture for planar lightwave circuits recited in claim 1 wherein multiple pairs of multimode waveguide section and mode filter are connected in series or in parallel.

3. The single mode photonic circuit architecture recited in claim 1 wherein mode filter structure is the combination of the waveguide lens and waveguide pin hole, the said waveguide pin hole removes the potential high order mode excitement at the waveguide lens section to ensure the single mode operation of the following planar lightwave circuits.

4. The single mode photonic circuit architecture recited in claim 2 wherein the mode filter structure is the combination of the waveguide lens and waveguide pin hole, said waveguide pin hole removes the potential high order mode excitement at the waveguide lens section to ensure the single mode operation of the following planar lightwave circuits.

5. Single mode photonic circuit architecture for planar lightwave circuits comprising a first multimode waveguide structure and a connected mode filter, said first multimode waveguide structure having more than one guiding mode and comprising a planar lightwave guiding film, said mode filter constructed in the same planar lightwave guiding film as the first multimode waveguide structure, said mode filter allowing only the fundamental mode to pass; and a second multimode waveguide structure comprising a planar lightwave guiding film.

6. The single mode photonic circuit architecture of claim 5, wherein the second multimode waveguide structure is constructed in the same planar lightwave guiding film as the first multimode waveguide structure and the mode filter.

7. The single mode photonic circuit architecture of claim 5, wherein a multimode waveguide structure and connected mode filter are connected in series.

8. The single mode photonic circuit architecture of claim 5, wherein the multimode waveguide structure is the ridge waveguide with the lateral index contrast greater than the single mode ridge waveguide at the same material system, so that small bend radius can be used; the said ridge waveguide with larger lateral index contrast is realized by deep etch into the silicon in a silicon-on-insulator film.

9. The single mode photonic circuit architecture of claim 5, wherein the multimode waveguide structure is a reflective structure in said planar lightwave guiding film.

10. The single mode photonic circuit architecture of claim 5, wherein the mode filter structure is the combination of a waveguide lens and a waveguide pin hole.

11. The single mode photonic circuit architecture of claim 10, wherein said waveguide pin hole removes potential high order mode excitement at the waveguide lens section to ensure the single mode operation of subsequent planar lightwave circuits.

12. The single mode photonic circuit architecture of claim 5, further comprising a third multimode waveguide structure.

13. The single mode photonic circuit architecture of claim 12, wherein the second multimode waveguide structure and third multimode waveguide structure are connected in series.

14. The single mode photonic circuit architecture of claim 12, wherein the second multimode waveguide structure and third multimode waveguide structure are connected in parallel.

15. A single mode photonic circuit comprising:
a multi-mode waveguide deposited on a substrate; and
a mode filter deposited on the substrate, said mode filter arranged to receive a signal from said multi-mode waveguide;
wherein a planar lightwave guiding film comprises a portion of both the multi-mode waveguide and the mode filter, the mode filter portion of the planar lightwave guiding film allowing only the fundamental mode to pass.

16. The single mode photonic circuit of claim 15, wherein the mode filter comprises pin hole.

17. The single mode photonic circuit of claim 16, wherein the mode filter further comprises a waveguide lens, said waveguide lens formed in said multi-mode waveguide.

18. The single mode photonic circuit of claim 15, the mode filter portion of the planar lightwave guiding film having a width that is less than a width of the multi-mode waveguide portion of the planar lightwave guiding film.

19. The single mode photonic circuit of claim 15, further comprising a second multi-mode waveguide arranged to receive a signal from said mode filter.

20. The single mode photonic circuit architecture of claim 15, wherein the multi-mode waveguide is a reflective structure in said planar lightwave guiding film.

* * * * *